(12) United States Patent
Pepper

(10) Patent No.: US 6,490,076 B2
(45) Date of Patent: Dec. 3, 2002

(54) OPTICAL PHASED ARRAY FOR DEPOLARIZED OPTICAL BEAM CONTROL

(75) Inventor: David M. Pepper, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/759,820

(22) Filed: Jan. 11, 2001

(65) Prior Publication Data

US 2002/0154377 A1 Oct. 24, 2002

(51) Int. Cl.[7] ............................... G02F 1/29; G02F 1/01
(52) U.S. Cl. ......................................... 359/315; 359/279
(58) Field of Search ................................ 359/122, 156, 359/246, 301–304, 315, 318, 414, 484, 487, 247, 254, 279, 316, 310; 349/77, 119, 87, 94, 33, 143; 356/4.01

(56) References Cited

U.S. PATENT DOCUMENTS

| | | | |
|---|---|---|---|
| 3,603,801 A | * 9/1971 | Harris et al. ................. 250/225 |
| 4,639,091 A | 1/1987 | Huignard et al. ............ 349/202 |
| 4,964,701 A | 10/1990 | Dorschner et al. .......... 349/202 |
| 5,018,835 A | 5/1991 | Dorschner .................... 349/140 |
| 5,093,740 A | 3/1992 | Dorschner et al. ............. 359/88 |
| 5,093,747 A | 3/1992 | Dorschner .................... 359/316 |
| 5,126,869 A | 6/1992 | Lipchak et al. ................ 359/94 |
| 5,151,814 A | 9/1992 | Grinberg et al. ............. 359/209 |
| 5,253,033 A | * 10/1993 | Lipchak et al. ............. 356/4.01 |
| 5,594,565 A | 1/1997 | DeJule et al. .................. 349/19 |
| 5,596,430 A | 1/1997 | Hasegawa et al. ............. 349/74 |
| 5,943,159 A | 8/1999 | Zhu ............................. 359/316 |
| 6,028,656 A | 2/2000 | Buhrer et al. ................ 349/196 |
| 6,160,597 A | * 12/2000 | Schadt et al. .................. 349/98 |
| 6,243,055 B1 | * 6/2001 | Fergason ......................... 345/32 |
| 2001/0022636 A1 | * 9/2001 | Yang et al. .................... 349/65 |
| 2002/0063829 A1 | * 5/2002 | Manabe et al. .............. 349/117 |

FOREIGN PATENT DOCUMENTS

JP 8-76111 * 3/1996

* cited by examiner

Primary Examiner—Jordan M. Schwartz
Assistant Examiner—William Choi
(74) Attorney, Agent, or Firm—Ladas & Parry

(57) ABSTRACT

A optical phased array device for optical beams with general polarization. A reflective embodiment of the inventive optical phased array interposes a quarter-wave plate between a linearly polarized liquid crystal layer and a mirror. A controllable voltage applied across the liquid crystal layer causes a first linearly polarized component of an incident optical beam to be phase shifted when it passes through the liquid crystal layer. The polarization of the optical beam is rotated by 90° when it travels through the quarter-wave plate, is reflected from the mirror, and travels back through the quarter-wave plate. The second linearly polarized component of the optical beam, orthogonal to the first, is phase shifted when it passes back through the liquid crystal layer. A transmissive embodiment of the inventive optical array interposes a half-wave plate between two linearly polarized liquid crystal layers. The first linearly polarized component is phase shifted by the first liquid crystal layer and the second component, orthogonal to the first, is phase shifted by the second layer.

45 Claims, 3 Drawing Sheets

OPTICAL PHASED ARRAY FOR DEPOLARIZED OPTICAL BEAM CONTROL

FIELD OF THE INVENTION

The present invention relates generally to optical devices and more specifically to methods and apparatus for electronic steering of an optical beam

BACKGROUND OF THE INVENTION

Precision control of optical beams is a pressing need in both the defense and commercial arenas. Precision optical beam control used for beam steering is required for laser communication, infrared countermeasures (IRCM), laser radar, and other areas. Precision beam control can also be used to implement optical switching and N×M interconnects for free-space and fiber networks. One device for providing precision optical beam control is the optical phased array (OPA).

An optical phased array is generally a liquid crystal-based device used for beam steering, optical switching, phase control, and other optical applications. Traditional optical phased arrays (OPAs) usually only function with laser beams with a well-defined linear polarization state, whose polarization vector is parallel to the liquid crystal axis. These single polarization OPAs can be implemented with a very thin liquid crystal layer, which provides high spatial resolution with a low drive voltage.

An optical phased array device is disclosed in U.S. Pat. No. 4,639,091, issued Jan. 27, 1987 to J.-P. Huignard et al. Huignard discloses an optical phased array comprising an electro-optical liquid crystal having an upper side upon which strip electrodes are disposed and a lower side upon which a common electrode, reflective at the optical beam wavelength, is disposed. Hence, the Huignard device is a reflective device, that is, it steers a beam that is directed onto and then reflected from the device. Due to the polarization characteristics of liquid crystal, the device disclosed by Huignard works to steer optical beams only with a linear polarization parallel to that of the liquid crystal. Beams with other polarizations will be steered less effectively, or not at all.

Another optical phased array device is disclosed in U.S. Pat. No. 5,093,740, issued Mar. 3, 1992 to T. A. Dorschner. The device disclosed by Dorschner comprises a liquid crystal layer sandwiched between a layer containing a transparent common electrode and a layer containing transparent stripe electrodes. The Dorschner device is a transmissive device in that it steers the optical beam received on one side of the liquid crystal layer and transmitted from the other side. Dorschner additionally discloses the use of alignment layers in proximity with the liquid crystal molecules to properly align the molecules with the polarization of the incident light. The stripe electrodes are arranged such that the longitudinal edges of the electrodes are orthogonal to the alignment of the liquid crystal molecules. In this arrangement, an optical beam having linear polarization aligned parallel to the liquid crystal alignment will be deflected in response to control voltages applied to the electrodes, while a beam having linear polarization orthogonal to the liquid crystal alignment will pass through the liquid crystal layer undeflected. Hence, the operation of the Dorschner device is effectively limited to linearly polarized beams.

An optical phased array device for two dimensional steering is disclosed in U.S. Pat. No. 5,126,869, issued Jun. 30, 1992 to Lipchak and Dorschner. Lipchak, et al. disclose two optical phased array devices, similar to the Dorschner device discussed above, separated by a half-wave plate. The two optical phased array devices are arranged such that the alignment of the liquid crystal molecules in one device is orthogonal to the alignment of the molecules in the second device. The first optical phased array device steers a linearly polarized optical beam in one dimension. Passage of the optical beam through the half-wave plate serves to rotate the polarization of the beam 90°. The second optical phased array device, since its polarization axis is orthogonal to the axis of the first device, can then steer the rotated beam in a second dimension. Note, however, that this two-dimensional device is again limited to linearly polarized beams.

There exists a need in the art for an improved optical phased array that can provide beam control with high spatial resolution for depolarized optical beams. There also exists a need for an optical phased array for depolarized optical beams that uses low drive voltages for beam control and can be constructed from a wide range of fabrication materials. Additionally, there exists a need for such an optical phased array that can be constructed with the use of simple fabrication and packing techniques.

SUMMARY OF THE INVENTION

It is therefore a primary object of the present invention to provide an optical phased array for depolarized optical beams. It is a further object of the present invention to provide an optical phased arrays that uses low drive voltages and can be constructed from a variety of materials.

A reflective embodiment of an optical phased array according to the present invention comprises a layered structure with an optical window receiving an incident optical beam to be steered, a first transparent electrode layer, a layer of electro-optically active material, a second electrode layer, a layer of material or a device which rotates the polarization of a light beam, and a mirrored surface that reflects the light back into the material or device which again rotates the polarization of the light. Preferably, the polarization of the light beam is rotated by 45° when it enters the material or device that rotates the polarization of the light. A voltage control device is used to control the voltages between the electrode layers, so as to create local variations in the index of refraction within the layer of electro-optically active material. The electro-optically active material is configured so as to phase shift only one linearly polarized component of the incident light beam. Typically, a liquid crystal layer provides this capability. Rotation of the polarization of the optical beam may be accomplished by a quarter-wave waveplate or other polarization rotators known in the art.

A method for steering an optical beam according to the present invention is provided by the steps of: directing the optical beam into a layer of transparent electro-optically active material sandwiched between two electrode layers, where the layer of electro-optically active material is oriented to phase shift only one polarized component; applying drive voltages to the electrode layers; rotating the polarization state of the optical beam to produce a rotated optical beam; and directing the rotated optical beam into the same layer or a different layer of transparent electro-optically active material. Preferably, the polarization state of the optical beam is rotated by 90° to allow for optimal control over both polarization components of the optical beam.

A transmissive embodiment of an optical phased array according to the present invention is provided by: an optical window; a first upper transparent electrode layer; a first layer of electro-optically active material; a first lower transparent electrode layer positioned such that the first layer of electro-optically active material is sandwiched between the first upper and lower electrode layers; a layer of material or a device which rotates the polarization state of an optical beam; a second upper transparent electrode layer; a second layer of electro-optically active material; a second lower transparent electrode layer positioned such that second layer of electro-optically active material is sandwiched between the second upper and lower transparent electrode layers; a first voltage controller connected to the first upper and lower transparent electrode layers to control an electric field between the first electrode layers to create local variations of refractive index in the first layer of electro-optically active material, and a second voltage controller connected to the second upper and lower electrode layers to control an electric field between the second electrode layers to create local variations of refractive index in the second layer of electro-optically active material. Preferably, the polarization of the light beam is rotated by 90° when it enters the material or device that rotates the polarization of the light. As in the case of the reflective embodiment, the layers of electro-optically active material are configured so as to phase shift only one polarization component of the incident optical beam. Preferably, layers of aligned liquid crystal material are used. The material or device to provide a rotation in the polarization of a light beam may be a quarter-wave waveplate or other polarization rotators known in the art. Voltage control over the electrodes may also be provided by devices known in the art and a single device may be used to control both sets of electrodes.

The present invention allows for the selection of a wider selection of waveplate media, which provides for improved device performance and cost, and allows for improved optical damage threshold capability and enhanced lifetime. An optical phased array according to the present invention provides spatial resolution and uses drive voltages for depolarized optical beams similar to optical phased arrays used for controlling singularly polarized optical beams.

DETAILED DESCRIPTION OF PREFERRED EMBODIMENTS

Figure 1:
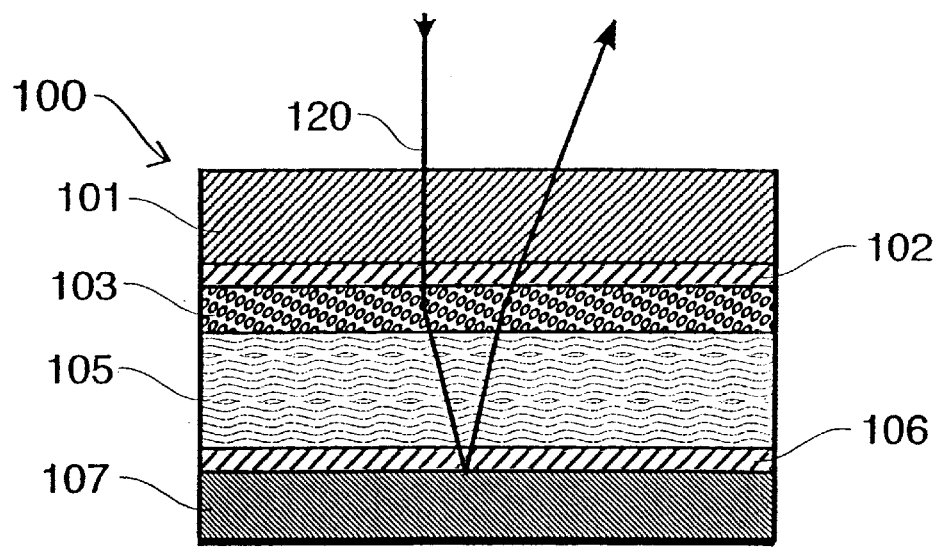
FIG. 1 shows a cross-sectional side view of a prior art optical phased array device for depolarized beams.

One example of an optical phased array device for control of depolarized beams is shown in FIG. 1. The optical phased array 100 comprises a transparent window 101, a first transparent electrode layer 102, a liquid crystal layer 103, a quarter-wave waveplate 105, a second transparent electrode layer 106, and a mirror 107. A depolarized light beam 120 enters the device 100 and passes through the liquid crystal layer 103 where one of its linear polarization states is affected and phase shifted, causing beam deflection of that state. The beam 120 then passes through the quarter-wave waveplate 105, is reflected by the mirror 107, and passes back through the quarter-wave waveplate 105. This causes the unaffected linear polarization state of the light beam 120 to be rotated by 90° so that the liquid crystal layer 103 may now affect and phase shift that linear polarization state, causing beam deflection of that linear polarization state. Upon exiting the device, the light beam 120 will have had both its linear polarization states deflected by the same amount, resulting in complete steering for the beam 120.

In the structure shown in FIG. 1, the voltage required for changing the refractive index within the liquid crystal layer 103 is applied across both the liquid crystal layer 103 and the quarter-wave waveplate 105. Application of the needed voltage in this manner results in limitations for the device shown in FIG. 1. Since the thickness of the liquid crystal layer 103 is typically on the order of four micrometers and the waveplate 105 can be as thick as several hundred micrometers to several millimeters, the required voltage is orders of magnitude greater than that required for a liquid crystal layer positioned directly between electrode layers (as described above for devices for linearly polarized optical beams). For rapid steering of an optical beam, for example, changing beam direction in less than a millisecond, the voltage "slew rate", i.e., the rate of change of voltage over time, would also be orders of magnitude greater than that required for the linearly polarized devices described above. Application and control of the required voltages would require high-power and complex power units. In addition, the fringing fields would degrade the spatial resolution, since the electric field is applied over a larger distance. Finally, since the liquid crystal must be aligned at the interface to the waveplate, the choice of waveplate material is limited. The choice of waveplate material is further limited because the electric field must be applied across the waveplate, eliminating materials that exhibit optical or physical changes due to an applied electric field.

Note that the device illustrated by FIG. 1 is a reflective device. A transmissive device according to this implementation may be constructed using a liquid crystal layer and half-wave waveplate sandwiched between two electrode layers. Such a device would require a larger voltage than that required for the reflective device described above, to achieve the desired beam steering angle. This would result in a further degradation in the spatial resolution of the device.

Alternatively, a transmissive device may be constructed by eliminating the mirror layer from the reflective device described above, and positioning two of such devices in a back-to-back configuration. The voltage control and spatial resolution problems described above would still exist in this configuration, and the device would be additionally complicated by the need to control two voltages for beam steering.

Optical phased array devices using a waveplate sandwiched between two sets of electrodes, as described above, demand a relatively thick overall device structure and, additionally, have stringent material constraints, leading to a degradation in spatial resolution and, moreover, require substantial drive voltages. Such devices accordingly will have stringent demands on the thicknesses of the waveplates and their materials, since they have to be compatible with the electrode layers and any other evaporated layers (such as layers for anti-reflection coatings).

Improved performance of an optical phased array is provided by locating the quarter-wave waveplate outside the region between the electrodes applying voltages across the liquid crystal layer. When the electrodes are located directly adjacent the liquid crystal layer, lower voltages are needed to achieve the desired change in the refractive index within the liquid crystal layer. Also, the electric field generated by the electrodes is less likely to be distorted, since the electrodes are located closer together.

Figure 2:
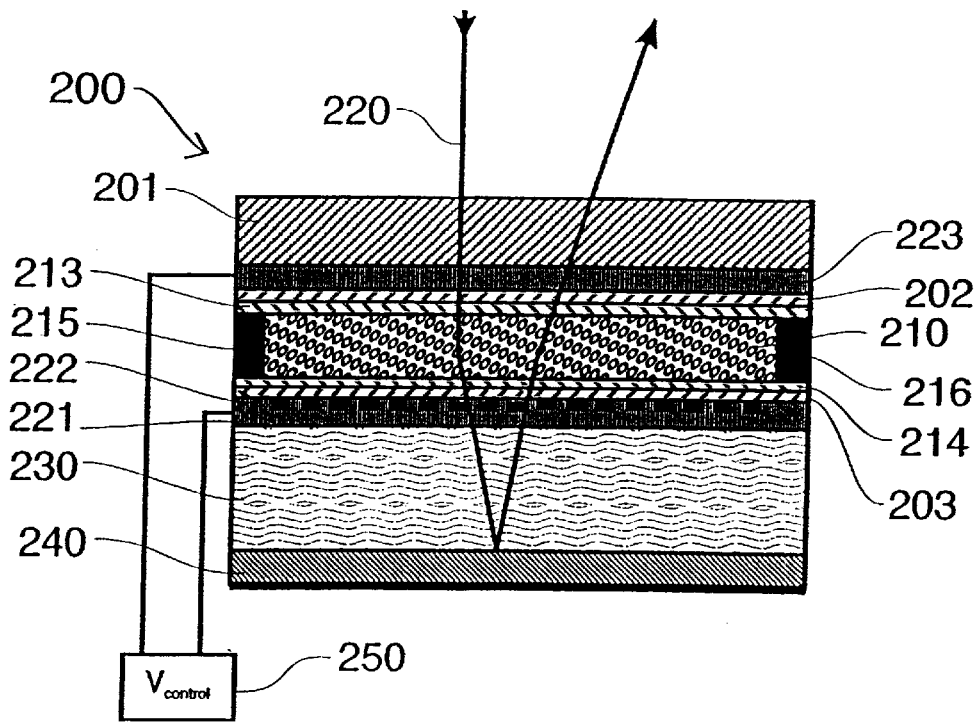
FIG. 2 shows a cross-sectional side view of a reflective optical phased array device according to the present invention.

Referring to FIG. 2, there is shown a simplified and dimensionally exaggerated side view of a reflective optical phased array 200 according to the principles of the present invention. The reflective optical phased array comprises a window 201, a common transparent electrode layer 223, a transparent stripe electrode layer 221, a transparent electro-optically (EO) active layer 210, a polarization rotator 230, and a mirror surface 240. This embodiment of the present invention differs from the optical phased array described above in that the polarization rotator 230 is disposed outside the space between the common electrode layer 223 and the stripe electrode layer 221. A voltage controller 250 controls the voltages applied between the common electrode layer 223 and the stripe electrode layer 221.

The transparent EO active layer 210 is preferably contained between spacers 215 and 216 which maintain a fixed spacing between the cell window 201 and the polarization rotator 230. The transparent EO active layer 210 preferably comprises a layer of liquid crystal molecules such as Type E7, supplied by British Drug House. Other liquid crystal materials, such as ferro-electric liquid crystals, polymer dispersed liquid crystals and others, known in the art, may also be used. Other electro-optically active materials which provide an electrically controllable phase shift for one axis of polarization of an incident optical beam, such as some classes of polymers and semiconductor multiple quantum well devices, may also be used. The typical thickness for the EO layer is 4 $\mu$m.

A voltage difference between the stripe electrode layer 221 and the common electrode 223 results in an electric field across the EO layer 210. The index of refraction within the EO layer 2 210 will change according to the applied electric field. In the embodiment shown in FIG. 2, the stripe electrode layer contains a plurality of stripe electrodes 222 having a relatively narrow width and a length extending across the EO layer 210. The voltage controller controls the voltage between each stripe electrode 222 and the common electrode 223 so as to cause the index of refraction within the EO layer 210 to vary in a direction that corresponds to the variation in voltage applied to each stripe electrode 222. The voltage controller 250 uses circuits well known in the art to control the voltage at each stripe electrode 222. Electrode means known in the art other than stripe electrodes 222 may be used in the stripe electrode layer 221 to provide a varying electric field across the EO layer 210. The common electrode layer 223 may comprise a uniformly conductive layer of transparent material, or other electrode means known in the art. Note also that the stripe electrode layer 221 may be placed beneath the window 201 and the common electrode layer 223 may be placed adjacent the polarization rotator 230.

Figure 4A:
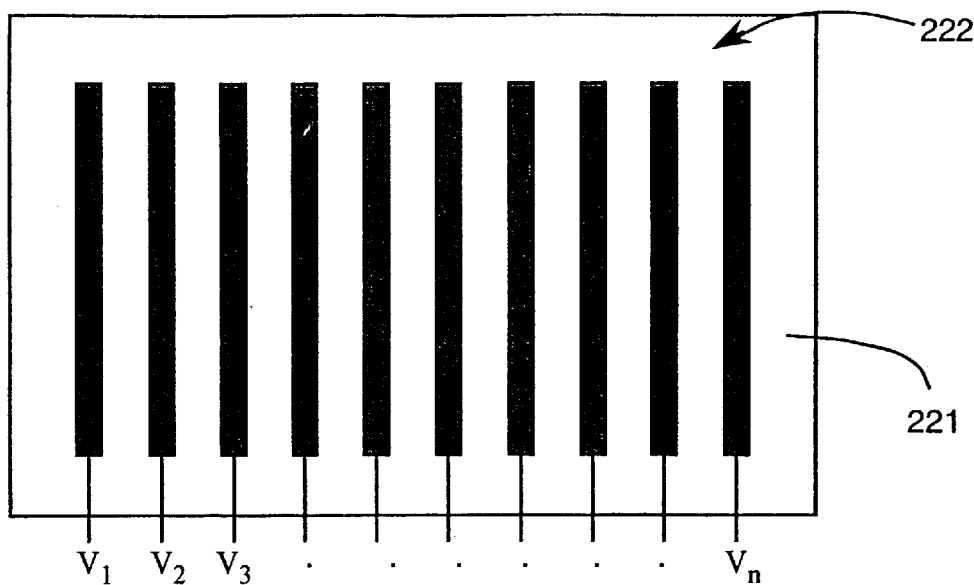
FIG. 4A shows stripe electrodes in an embodiment of the present invention arranged as thin strips within an electrode layer.
Figure 4B:
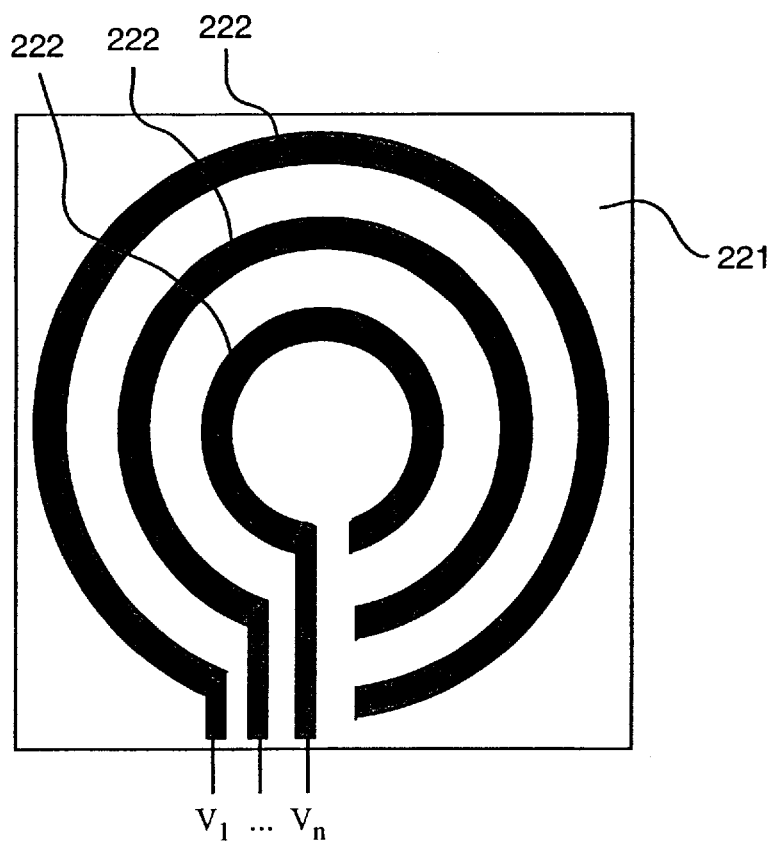
FIG. 4B shows stripe electrodes in an embodiment of the present invention arranged as nearly full concentric annular rings.

Both the common electrode 223 and the stripe electrode layer 221 are constructed from materials that are transparent to the incident optical beam 220. Indium-tin-oxide (ITO) is one material that is transparent to visible light and may be used to construct the necessary electrodes. The common electrode 223 may consist of a layer of ITO applied uniformly across the underside of the cell window 201. The stripe electrode layer 221 may consist of stripe electrodes 222 which typically have a uniform width and spacing, as shown in FIG. 4A. Alternatively, the stripe electrodes 222 may have nonuniform widths or spacings to provide optical correction or different grating effects. The stripe electrodes 222 in the stripe electrode layer 221 may also be in the form of nearly full concentric annular rings, as shown in FIG. 4B. Electrodes in this form can be controlled to provide controllable lensing or focusing of an incident optical beam, or can be controlled to provide a variable-sized aperture.

The size, spacing, and number of the electrodes depend upon the amount of control desired over the steered optical beam. Thinner, more densely packed electrodes provide the ability to control the refractive index within the EO layer 210 more precisely and, therefore, control the steering angle of the optical beam to a higher resolution. However, control over additional electrodes also additionally complicates the means used for controlling the voltages at the electrodes. Typically, the electrode width can vary from less than one micron to over 1000 microns (1 millimeter). The spacing between the electrodes also varies in a similar fashion. The number of electrodes depends upon the overall size of the device, the density of the electrodes, and the means used for controlling the voltage at each electrode.

A thin anti-reflection layer 202 is preferably provided between the common electrode 223 and the EO layer 210 to provide for maximum light transmission into the EO layer 210 since the common electrode 223 and EO layer 210 are likely to be made of materials with different refraction indices. The anti-reflection layer 202 may be provided by anti-reflection coatings well known in the art. It will also be recognized that the anti-reflection layer 202 may be provided by an index-matching epoxy which creates a reflection-free interface between dissimilar materials. A thin anti-reflection layer 203 is preferably also provided between the stripe electrode layer 221 and the EO layer 210. This thin anti-reflection layer may also comprise an anti-reflection coating or index-matching epoxy.

If the EO layer 210 comprises liquid crystal material, preferably, thin alignment layers 213 and 214 are interposed between the liquid crystal material in the EO layer 210 and the anti-reflection coatings 202 and 203 to properly align the liquid crystal molecules at the boundaries of the layer 210. The alignment of the liquid crystal molecules may be selected to provide the maximum phase shift for the electric field applied across the EO layer 210 by the voltage difference between the common electrode 223 and the strip electrode layer 221. It has been determined that a preferable quiescent alignment of the liquid crystal molecules is orthogonal to the longitudinal edges of the strip electrodes 222. For this case, the liquid crystal acts as a phase shifter for rays polarized perpendicular to the plane of incidence.

The optical phased array of FIG. 2 is responsive to non-polarized light beams in the visible and other spectra, according to the materials and dimensions used in constructing the device. A light beam, represented in FIG. 2 as a single ray 220, is directed onto a outer face of window 201. In the liquid crystal layer 210, the components of the light beam 220 with a linear polarization parallel to the alignment of the liquid crystal molecules will be phase shifted according the variation of the refractive index within the layer 210. The phase shifts will result in a change in the direction of the light beam. The components of the light beam with a linear polarization orthogonal to the polarization alignment of the EO layer 210 will be unaffected. When the light beam travels through the polarization rotator 230, is reflected by the mirror surface 240, and travels back through the quarter-wave plate 230, the polarization of the light beam will be rotated by 90°. A quarter-wave waveplate may be used as the polarization rotator 230. Hence, the components of the light beam previously orthogonal to the polarization alignment of the EO layer 210 will now be parallel to the EO layer 210 alignment, and affected by the refractive index change within the layer 210. Thus, these components will be phase shifted, resulting in a change in the direction of the light beam 220. The end result of the light beam traveling into and then out of the optical phased array 220 will be that both linear polarization components will be steered by the same angular amount.

Sandwiching the EO layer 210 directly between the electrode layers 221 and 223 allows lower applied voltages to be used to change the refractive index of the EO layer 210. Also, the fringing fields of the electric field between the electrodes are reduced, again due to the smaller distance between the electrodes. As an example, a birefringence change of 0.2 is obtained for a 7 volt differential across a 4 $\mu$m thick liquid crystal layer of Type E7. Optical phased array devices incorporating significantly thicker liquid crystal layers or devices where the voltage applying electrodes are separated by greater distances will require higher voltages, increasing the complexity of the device.

In the present example, optically transparent common electrode 223 may be provided on the cell window 201 and optically transparent strip electrode layer 221 may be provided on a polarization rotator 230, such as a quarter-wave waveplate, by a process of ion-implantation, or other processes known in the art. The cell window 201 and the polarization rotator 230 may be fabricated of gallium arsenide, polymers, liquid crystal, or other materials known in the art. If the polarization rotator 230 comprises a quarter-wave waveplate, the thickness of the quarter-wave waveplate will depend upon the desired operating wavelength for the optical phased array. Typical thicknesses will vary from several hundred micrometers to several millimeters.

To limit the cost of the optical phase array 200, the polarization rotator 230 may be a simple non-achromatic quarter-wave plate, purchased from commercial firms such as Nitto Denko America in San Jose, Calif. At a higher cost, an achromatic quarter-wave waveplate, available from Meadowlark Optics in Longmont, Colo., for example, may also be used. Optical retarder film may be used for the polarization rotator 230 rather than a quarter-wave waveplate to provide the necessary 90° twist in polarization. Other optical polarization rotation means known in the art may also be used for the polarization rotator 230, such as a Faraday rotator.

Preferably, anti-reflection layers 202, 203 are used to reduce the reflections when light passes from one-optically transmissive medium to another. Single layer and multiple layer anti-reflection coatings are well known in the art and are used to effectively eliminate reflections. Ideally, a single anti-reflection layer 202, 203 comprises a material whose effective refractive index is the geometric means of the two media to be matched. Multiple anti-reflection layers 202, 203 may be used for improved performance, as is well known in the art.

If liquid crystal material is used for the EO layer 210, the liquid crystals should be properly and uniformly aligned, in order to exhibit the desired birefringence in a bulk device. This is usually done by special treatment of the surfaces contacting the liquid crystal layer 210, in this case, the alignment layers 213 and 214. If these layers have been striolated by, for example, rubbing unidirectionally with fine grinding powder to produce extremely fine, parallel striolae, the liquid crystal molecules of the EO layer 210 will tend to align themselves along and in these minute grooves and thereby be preferably aligned. If the EO layer 210 using liquid crystal material is thin, as is the preferred case, and if the grooves in the alignment layers 213 and 214 are parallel, this positional orientation is transferred across the cell by the natural tendencies of the liquid crystal molecules to align parallel to one another.

Figure 3:
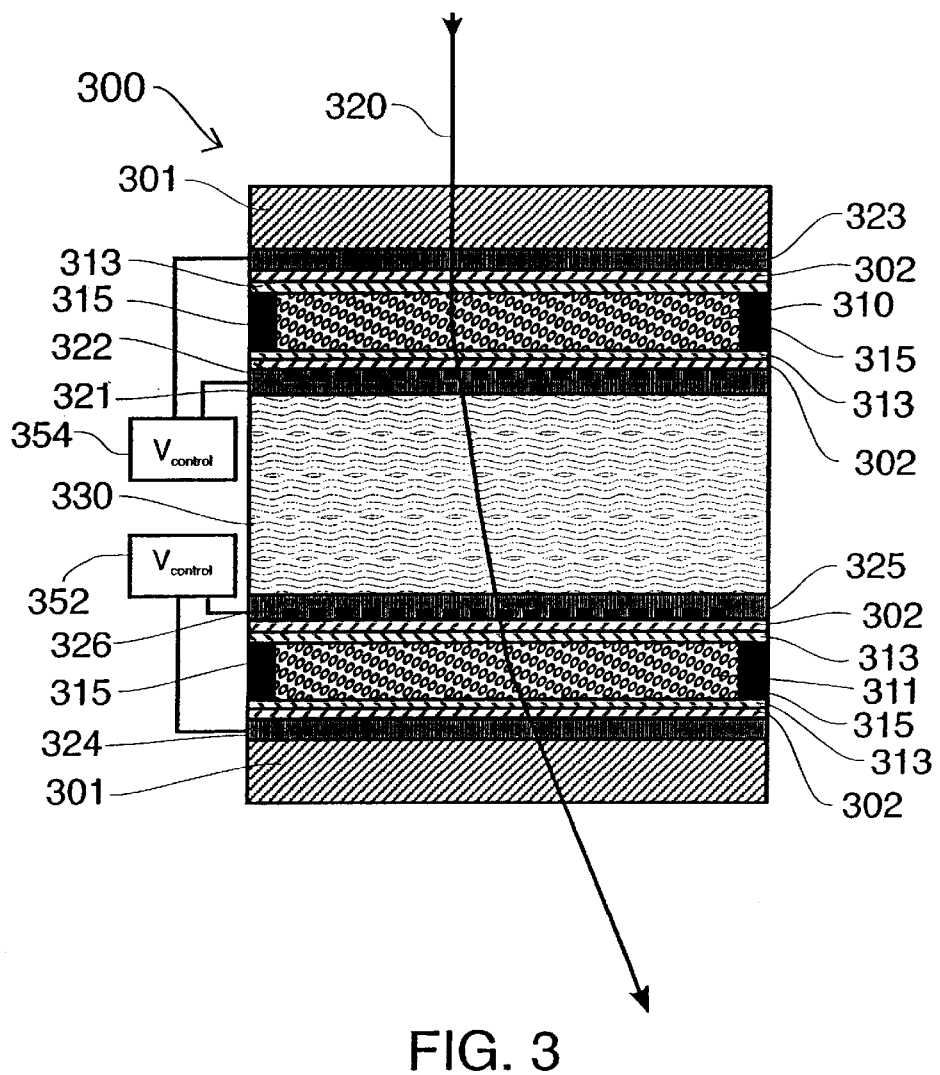
FIG. 3 shows a cross-sectional side view of a transmissive optical phased array device according to the present invention.

An alternative embodiment of the present invention provides a transmissive optical phased array. Referring to FIG. 3, there is shown a simplified and dimensionally exaggerated side view of a transmissive optical phased array 300 according to the principles of the present invention. The transmissive optical phased array 300 comprises a first transparent EO layer 310 interposed between a first common electrode layer 323 and a first stripe electrode layer 321, a second transparent EO layer 311 also interposed between a second common electrode layer 324 and a second stripe electrode layer 325, and a polarization rotator 330 separating the two sets of EO layers 310, 311 and the electrodes 321, 323, 324, 325. A voltage controller 350 controls the voltages applied across the first and second liquid crystal layers 310, 311.

The individual layers of the transmissive optical phased array 300 are similar to those of the reflective phased array 200. Alignment layers 313 are preferably used to align the liquid crystal molecules in the EO layers 310,311 for the proper polarization, when the EO layers 310, 311 comprise liquid crystal materials. Anti-reflective layers 302 are preferably used to minimize reflections as light passes from one medium to another. As disclosed above, index matching epoxy may also be used to minimize reflections between media. Light enters the device 300 through a cell window 301 and leaves the device through a similar cell window 301.

As disclosed above, the first EO layer 310 and second EO layer 311 may be disposed between spacers 315, which are used to maintain a fixed distance between the electric field applying electrode layers 321, 323, 324, 325. If the EO layers 310, 311 comprise liquid crystal material, liquid crystal material, such as British Drug House Type E7 or other liquid crystal material, may be used in these layers, as previously described.

The polarization of the first EO layer 310 will be aligned so as to phase shift one linearly polarized component of the incident optical beam 320. As in the embodiment of the reflective optical phased array 200 described above, the first common electrode layer 323, the first stripe electrode layer 321, and the stripe electrodes 322 are disposed so as to provide an electric field that results in a varying refractive index across the liquid crystal layer 310. Other means for applying an electric field across the liquid crystal layer 301 may also be used.

The polarization of the second EO layer 311 is aligned so as to have a polarization orientation parallel to that of the first EO layer 310. The second common electrode layer 324, the second stripe electrode layer 325, and the stripe electrodes 326 are disposed so as to provide an electric field that results in a varying refractive index across the second EO layer 311. The stripe electrodes 326 in the stripe electrode layer 325 are disposed in an orientation that is preferably parallel to the orientation of the strip electrodes in the strip electrode layer 321 adjoining the first EO layer 310. This orientation maximizes the refractive index change within the liquid crystal layer 311 and thus maximizes the phase shift applied to the optical beam 320.

In operation, the optical beam 320 enters the first EO layer 310, where the linearly polarized component of the optical beam 320 parallel to the polarization alignment of the EO layer 310 will be phase shifted according to the variation of the refractive index across the layer 310. A first voltage controller 354 is used to control the voltage at each stripe electrode 322 to provide the required phase shift and thus the desired steering angle. The linearly polarized component that is orthogonal to the alignment of the first EO layer 310 will not be affected.

The light beam 320 then enters the polarization rotator 330 where its polarization is rotated by 90°. Thus, the linearly polarized component previously parallel to the polarization alignment of the first EO layer 310 will now be orthogonal to that alignment. The linearly polarized component previously orthogonal to the polarization alignment of the first EO layer 310 will be parallel to that alignment after passage through the polarization rotator 330. A second voltage controller 352 is used to control the voltage at each stripe electrode 326 to provide the required phase shift and the desired steering angle in the second EO layer 311. Thus, when the light beam 320 enters the second EO layer 311, the unsteered component of the light beam 320 will be phase shifted and steered by the refractive index change in the layer 311. The previously steered component will not be affected by the refractive index change.

If the EO layers 310, 311 are similarly fabricated and the same voltage control is applied to the stripe electrode layers 321, 325, each of the incident polarization components will, upon transmission through the optical phased array device 300, experience the same spatially imposed set of phase shifts and will thus be steered by the same amount. Therefore, the voltage control provided by the first voltage controller 354 and the second voltage controller 352 may be provided by a single device. Voltage controllers providing the necessary voltage and sequencing of the voltage are known in the art.

The materials and methods to fabricate the reflective optical phased array 200 described above may also be used to fabricate the transmissive optical phased array device 300.

From the foregoing description, it will be apparent that the present invention has a number of advantages, some of which have been described above, and others of which are inherent in the embodiments of the invention described above. Also, it will be understood that modifications can be made to the optical phased array and the method for optical beam control described above without departing from the teachings of subject matter described herein. As such, the invention is not to be limited to the described embodiments except as required by the appended claims.

What is claimed is:

1. An optical phased array comprising:
   an optical window oriented to receive an incident optical beam having a polarization state with a first polarized component and a second polarized component, said second polarized component orthogonal to the first polarized component;
   a first transparent electrode layer positioned beneath the optical window;
   a transparent electro-optic layer positioned beneath the first transparent electrode layer, said electro-optic layer receiving said incident optical beam and aligned so as to phase shift only one polarized component;
   a second transparent electrode layer beneath the electro-optic layer, such that the electro-optic layer is sandwiched between the first transparent electrode layer and the second transparent electrode layer;
   a polarization rotator positioned beneath said second transparent electrode layer, said polarization rotator receiving the incident optical beam from the electro-optic layer and rotating its polarization state;
   a mirror surface layer positioned beneath said polarization rotator, said mirror surface layer reflecting the incident optical beam back into the polarization rotator; and
   a voltage control means connected to the first transparent electrode layer and to the second transparent electrode layer, the voltage control means controlling voltages between the first transparent electrode layer and the second transparent electrode layer, the voltages creating local variations of refractive index in the electro-optic layer.

2. An optical phased array according to claim 1, wherein the polarization rotator rotates the polarization state of the incident optical beam by 45°.

3. An optical phased array according to claim 1, wherein the electro-optic layer comprises a layer of liquid crystal material.

4. An optical phased array according to claim 1, wherein the polarization rotator comprises a layer of optical retarder film.

5. An optical phased array according to claim 1, wherein the polarization rotator comprises a quarter-wave waveplate.

6. An optical phased array according to claim 1, wherein the polarization rotator comprises a Faraday rotator.

7. An optical phased array according to claim 1, wherein one transparent electrode layer comprises a layer of uniformly conductive film and the other transparent layer comprises a plurality of stripe electrodes.

8. An optical phased array according to claim 7, wherein the stripe electrodes are disposed longitudinally within the electrode layer, the stripe electrodes having a narrow width and a length nearly equal to a longitudinal direction of the electro-optic layer.

9. An optical phased array according to claim 7, wherein the stripe electrodes are disposed in nearly full concentric annular rings, the stripe electrodes having a narrow width and each electrode has a progressively smaller radii.

10. An optical phased array according to claim 3, wherein the layer of liquid crystal material is sandwiched between alignment layers.

11. A method for steering an optical beam having a polarization state with a first polarized component and a second polarized component, said method comprising the steps of:
    directing the optical beam into a first layer of transparent electro-optically active material sandwiched between two electrode layers, the layer of electro-optically active material oriented so as to phase shift only one polarized component;
    applying drive voltages to the electrode layers;
    rotating the polarization state of the optical beam to produce a rotated optical beam; and
    directing the rotated optical beam into a second layer of transparent electro-optically active material sandwiched between two electrode layers, the layer of electro-optically active material oriented so as to phase shift only one polarized component.

12. The method according to claim 11 wherein the step of rotating the polarization state of the optical beam comprises rotating the polarization state of the optical beam by 90°.

13. The method according to claim 11 wherein each layer of electro-optically active material comprises a layer of liquid crystal material.

14. The method according to claim 11 wherein a single layer of electro-optically active material comprises the first layer of electro-optically active material and the second layer of electro-optically active material.

15. The method according to claim 11 wherein the step of rotating the polarization state of the optical beam comprises the steps of:
    directing the optical beam into a polarization rotator which rotates the polarization state of the optical beam to produce a semi-rotated optical beam; and
    directing the semi-rotated optical beam onto a reflective surface, which reflects the semi-rotated beam back into the polarization rotator.

16. The method according to claim 15 wherein the polarization rotator is a quarter-wave plate.

17. The method according to claim 11 wherein the step of rotating the polarization state is provided by a Faraday rotator.

18. The method according to claim 11 wherein step of rotating the polarization state is provided by optical retarder film.

19. The method according to claim 11 wherein the step of rotating the polarization state is provided by a half-wave plate.

20. An optical phased array comprising:
    an optical window oriented to receive an incident optical beam having a polarization state with a first polarized component and a second polarized component, the second polarized component orthogonal to the first polarized component;
    a first upper transparent electrode layer positioned beneath said optical window;
    a first transparent electro-optic layer positioned beneath said first upper transparent electrode layer, said first transparent electro-optic layer receiving said incident optical beam and aligned so as to phase shift a first polarized component;
    a first lower transparent electrode layer positioned beneath the first transparent electro-optic layer such that the first transparent electro-optic layer is sandwiched between the first upper transparent electrode layer and the first lower transparent electrode layer;
    a polarization rotator positioned beneath the first lower transparent electrode layer, the polarization rotator receiving the incident optical beam from the first transparent electro-optic layer and rotating its polarization state;
    a second upper transparent electrode layer positioned beneath the polarization rotator;
    a second transparent electro-optic layer positioned beneath the second upper transparent electrode layer, the second transparent electro-optic layer receiving the optical beam from the polarization rotator and aligned so as to phase shift a polarized component parallel to the first polarized component;
    a second lower transparent electrode layer positioned beneath the second electro-optic layer such that the second transparent electro-optic layer is sandwiched between the second upper transparent electrode layer and the second lower transparent electrode layer;
    a first voltage controller connected to the first upper transparent electrode layer and to the first lower transparent electrode layer to control a first set of voltages between the first upper transparent electrode layer and the first lower transparent electrode layer, the first set of voltages creating local variations of refractive index in the first transparent electro-optic layer; and
    a second voltage controller connected to the second upper transparent electrode layer and to the second lower transparent electrode layer to control a second set of voltages between the second upper transparent electrode layer and the second lower transparent electrode layer, the second set of voltages creating local variations of refractive index in the second transparent electro-optic layer.

21. An optical phased array according to claim 20, wherein the polarization rotator rotates the polarization state of the incident optical beam by 90°.

22. An optical phased array according to claim 20, wherein the first electro-optic layer comprises a layer of liquid crystal material and the second electro-optic layer comprises a layer of liquid crystal material.

23. An optical phased array according to claim 20, wherein the polarization rotator comprises a layer of optical retarder film.

24. An optical phased array according to claim 20, wherein the polarization rotator comprises a half-wave plate.

25. An optical phased array according to claim 20, wherein the polarization rotator comprises a Faraday rotator.

26. An optical phased array according to claim 20, wherein one of the first electrode layers comprises a layer of uniformly conductive film and the other first electrode layer comprises a plurality of stripe electrodes, and one of the second electrode layers comprises a layer of uniformly conductive film and the other second electrode layer comprises a plurality of stripe electrodes.

27. An optical phased array according to claim 26, wherein the stripe electrodes are disposed longitudinally with the electrode layers, the stripe electrodes having a narrow width and extending across the electrode layer.

28. An optical phased array according to claim 26, wherein the stripe electrodes are disposed in nearly full concentric annular rings, the stripe electrodes having a narrow width and each electrode having a progressively smaller radii.

29. An optical phased array according to claim 22, wherein the layers of liquid crystal material are sandwiched between alignment layers.

30. An optical phased array according to claim 20, wherein a single voltage controller provides both the first voltage controller and the second voltage controller.

31. The method according to claim 11 wherein the first layer of transparent electro-optically active material has a polarization orientation and the second layer of transparent electro-optically active material has a polarization orientation, the polarization orientation of the second layer of transparent electro-optically active material being oriented parallel to the polarization orientation of the first layer of transparent electro-optically active material.

32. The method according to claim 11 wherein the first layer of transparent electro-optically active material phase shifts the first polarized component of the optical beam and the second layer of transparent electro-optically active material phase shifts the second polarized component of the optical beam.

33. A method for providing an optical phased array comprising the steps of:
    sandwiching a first transparent electro-optic layer between a first upper transparent electrode layer and a first lower transparent electrode layer, the first upper transparent electrode layer receiving an incident optical beam having a polarization state with a first polarized component and a second polarized component, the second polarized component orthogonal to the first polarized component;

applying a first set of voltages to the first upper transparent electrode layer and to the first lower transparent electrode layer, the first set of voltages creating local variations of refractive index in the first transparent electro-optic layer;

rotating the first polarized component and the second polarized component of the incident optical beam, resulting in a rotated first polarized component and a rotated second polarized component;

placing a second transparent electro-optic layer between a second upper transparent electrode layer and a second lower transparent electrode layer, the second upper transparent electrode layer receiving said rotated first polarized component and said rotated second polarized component; and providing a second set of voltages to the second upper transparent electrode layer and to the second lower transparent electrode layer, the second set of voltages creating local variations of refractive index in the second transparent electro-optic layer.

34. The method according to claim 33 wherein the step of rotating is further defined by rotating the first polarized component and the second polarized component by 90 degrees.

35. The method according to claim 33 wherein the first transparent electro-optic layer comprises a layer of liquid crystal material and the second transparent electro-optic layer comprises a layer of liquid crystal material.

36. The method according to claim 33 wherein the step of rotating is provided by a layer of optical retarder film.

37. The method according to claim 33 wherein the step of rotating is provided by a half-wave plate.

38. The method according to claim 33 wherein the step of rotating is provided by a Faraday rotator.

39. The method according to claim 33, wherein one of the first electrode layers comprises a layer of uniformly conductive film and the other first electrode layer comprises a plurality of stripe electrodes, and one of the second electrode layers comprises a layer of uniformly conductive film and the other second electrode layer comprises a plurality of stripe electrodes.

40. The method according to claim 39, wherein the stripe electrodes are disposed longitudinally with the electrode layers, the stripe electrodes having a narrow width and extending across the electrode layer.

41. The method according to claim 39, wherein the stripe electrodes are disposed in nearly fully concentric annular rings, the stripe electrodes having a narrow width and each electrode having progressively smaller radius.

42. The method of claim 35 further comprising the step of placing alignment layers above and below the layers of liquid crystal material.

43. The method of claim 33 wherein the step of applying a first voltage set and the step of providing a second voltage set is provided by a single voltage controller.

44. An optical phased array device comprising:

a depolarized beam having a first component and a second component;

a transparent window for receiving the depolarized beam;

a first transparent electrode layer disposed beneath the transparent window;

a transparent electro-optic layer disposed beneath the first transparent electrode, the transparent electro-optic layer orientated to phase shift the first component of the depolarized beam;

a second transparent electrode layer disposed beneath the transparent electro-optic layer;

a polarization rotator disposed beneath the second transparent electrode layer, the polarization rotator rotating the depolarized beam resulting in a first rotated component and a second rotated component;

a mirror surface disposed beneath the polarization layer, the mirror surface reflecting the depolarized beam resulting in a first rotated reflected component and the second rotated reflected component; and a voltage control means connected to the first transparent electrode layer and to the second transparent electrode layer, the voltage applied to the first transparent electrode layer and the second transparent electrode layer creating local variations of refractive index in the transparent electro-optic layer, wherein the transparent electro-optic layer phase shifts the second rotated reflected component.

45. A method of optical beam steering comprising the steps of:

receiving a first component and a second component of a depolarized beam;

phase shifting the first component, wherein the step of phase shifting further comprises the steps of:
passing the first component through an electro-optic layer sandwiched between two electrode layers; and
applying a voltage to the two electrode layers, creating local variations of refractive index in the electro-optic layer;

phase rotating the first component and the second component; and reflecting the first component and the second component, resulting in a reflected first component and a reflected second component whereby the second component is phase shifted as the reflected second component passes through the electro-optic layer sandwiched between the two electrode layers.

* * * * *